United States Patent
Lauzon

(10) Patent No.: US 12,503,183 B2
(45) Date of Patent: Dec. 23, 2025

(54) BICYCLE RACK

(71) Applicant: Marc Lauzon, Wheat Ridge, CO (US)

(72) Inventor: Marc Lauzon, Wheat Ridge, CO (US)

( * ) Notice: Subject to any disclaimer, the term of this patent is extended or adjusted under 35 U.S.C. 154(b) by 547 days.

(21) Appl. No.: 17/404,442

(22) Filed: Aug. 17, 2021

(65) Prior Publication Data

US 2022/0048583 A1 Feb. 17, 2022

Related U.S. Application Data

(60) Provisional application No. 63/192,825, filed on May 25, 2021, provisional application No. 63/066,458, filed on Aug. 17, 2020.

(51) Int. Cl.
*B62H 3/08* (2006.01)

(52) U.S. Cl.
CPC ...................................... *B62H 3/08* (2013.01)

(58) Field of Classification Search
CPC ........... B62H 3/08; B62H 3/12; B25H 1/0014
See application file for complete search history.

(56) References Cited

U.S. PATENT DOCUMENTS

| | | | | |
|---|---|---|---|---|
| 2,944,811 A | * | 7/1960 | Joseph | B25H 1/0014 269/297 |
| 5,607,064 A | | 3/1997 | Fourel | |
| 5,687,857 A | * | 11/1997 | Friedman | F16M 11/041 211/89.01 |
| 5,941,397 A | | 8/1999 | Buchanan et al. | |
| 5,988,403 A | * | 11/1999 | Robideau | B62H 3/08 211/20 |
| 5,996,870 A | * | 12/1999 | Shaver | B60R 9/06 224/532 |
| 6,241,104 B1 | * | 6/2001 | Kraus | B62H 3/04 211/20 |
| 6,640,979 B1 | * | 11/2003 | Mayfield | B62H 3/04 211/20 |
| 10,618,582 B1 | * | 4/2020 | Liu | B62H 3/06 |
| 2011/0233154 A1 | * | 9/2011 | St. Louis | B62H 3/08 211/13.1 |
| 2013/0270201 A1 | | 10/2013 | Vineyard | |
| 2018/0134228 A1 | * | 5/2018 | Lathrop | B62D 33/02 |

FOREIGN PATENT DOCUMENTS

JP 3155357 U 10/2009

OTHER PUBLICATIONS

Notification of Transmittal of the International Search Report and the Written Opinion of the International Searching Authority, or the Declaration dated Dec. 10, 2021 for International Patent Application No. PCT/US2021/046263 (9 pages).

* cited by examiner

*Primary Examiner* — Ko H Chan
(74) *Attorney, Agent, or Firm* — James Gourley

(57) ABSTRACT

A bicycle rack system to hold a bicycle including a structural member, a swing arm and a plurality of wheel cradles. The swing arm is pivotally coupled to the structural member. The plurality of wheel cradles each have a shape to accommodate a shape of a wheel of the bicycle, and include a first wheel cradle and a second wheel cradle. The first wheel cradle is secured to a distal end of the swing arm, and the second wheel cradle is coupled to the structural member.

20 Claims, 8 Drawing Sheets

BICYCLE RACK

CROSS REFERENCE TO RELATED APPLICATIONS

This is a non-provisional application based upon U.S. provisional patent application Ser. No. 63/066,458, entitled "BICYCLE RACK", filed Aug. 17, 2020, which is incorporated herein by reference, and upon U.S. provisional patent application Ser. No. 63/192,825, entitled "BICYCLE WORK STAND", filed May 25, 2021, which is also incorporated herein by reference.

BACKGROUND OF THE INVENTION

1. Field of the Invention

The present invention relates to bicycles, and, more particularly, to an adaptive bicycle rack for holding a bicycle.

2. Description of the Related Art

There is a continuing interest in bicycling, even branching into off-road or mountain biking. It is commonplace to see bicycle enthusiasts transporting their bicycles on motor vehicles. Bicycle owners also have a need to store their bicycles. Some people who live in single-family dwellings store their bicycles in a garage, carport, or basement. Apartment dwellers and college students often keep their bicycles in their apartments or dorm rooms. Regardless of their home type, bicycle owners generally need several feet of uninterrupted horizontal storage space to accommodate their bicycle. Bicycle storage presents further challenges if multiple bicycles are to be stored.

In many instances, rather than simply leaning the bike on its kickstand, a bike owner would prefer to store his bicycle on wall-mounted hooks or a stand to prevent the bicycle from leaving mud or dirt on the floor and to prevent the handlebars from scuffing the walls. Traditional bicycle stands support the bicycle in a riding position—that is, in a generally horizontal orientation—that requires storage space at least the length of the bicycle.

What is needed in the art is an efficient bicycle storage system that easily engages with, and disengages from, the bicycle.

SUMMARY OF THE INVENTION

The present invention provides a bicycle rack system that engages a wheel of the bicycle.

The invention in one form is directed to a bicycle rack system to hold a bicycle including a structural member, a swing arm and a plurality of wheel cradles. The swing arm is pivotally coupled to the structural member. The plurality of wheel cradles each have a shape to accommodate a shape of a wheel of the bicycle, and includes a first wheel cradle, a second wheel cradle, and a third wheel cradle. The first wheel cradle is secured to a distal end of the swing arm, and the second wheel cradle is coupled to the structural member.

The invention in another form is directed to a method of holding a bicycle in a bicycle rack system including the steps of: moving a wheel of the bicycle against a first wheel cradle of a swing arm, the moving of the wheel causing the swing arm to traverse in a pivotal direction relative to a structural member; and engaging a portion of the wheel in a second wheel cradle while the first wheel cradle and the swing arm traverse opposite to the pivotal direction to thereby engage the wheel in the first and second wheel cradles.

An advantage of the bicycle rack of the present invention is that the rack engages a wheel of the bicycle in an over-center manner.

Another advantage of the bicycle rack of the present invention is that the bicycle is engaged and disengaged with the rack system without the use of straps, fasteners or any engaging items that have to be separately applied to the bicycle.

Yet another advantage is that once the rack is engaged, the bicycle is securely mounted without the rack contacting any portions of the bike frame.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
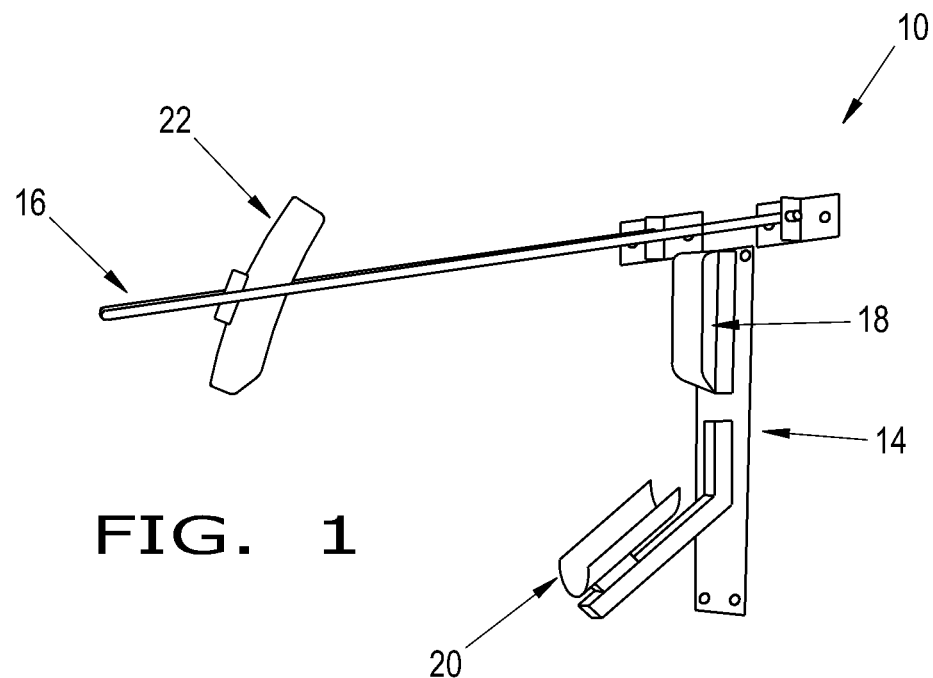
FIG. 1 is a side perspective view of an embodiment of a bicycle rack system of the present invention installed on a wall.
Figure 2:
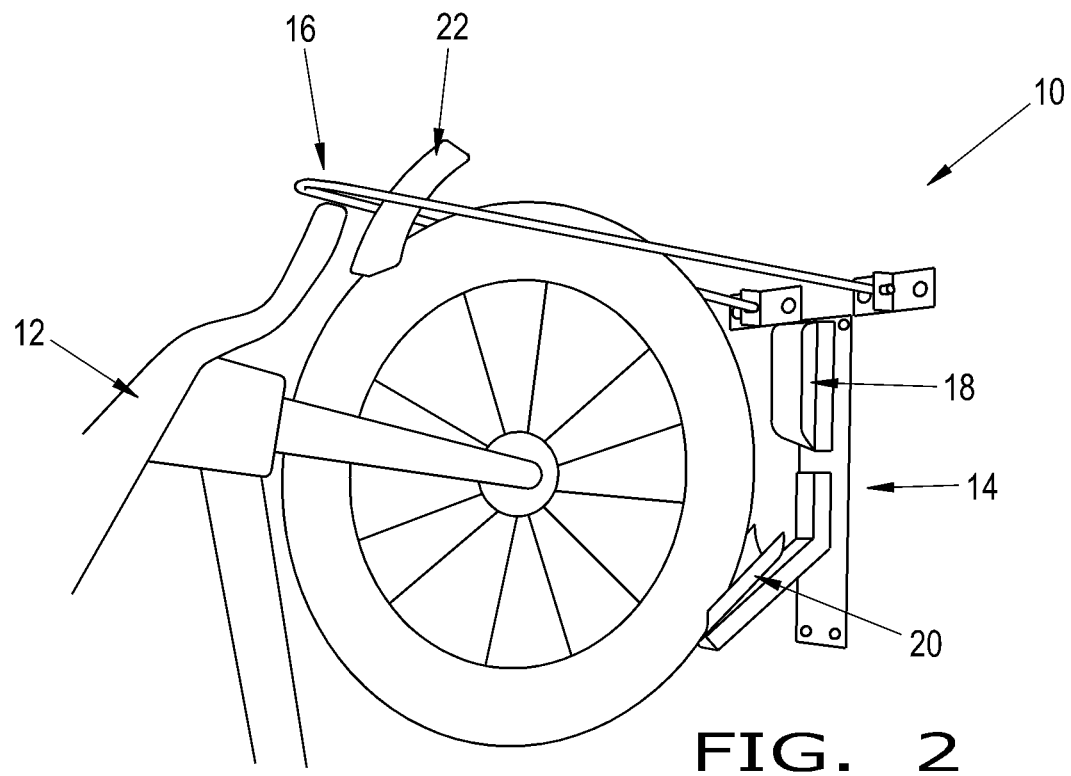
FIG. 2 is another side perspective view of the bicycle rack of FIG. 1 with a front wheel of a bicycle being positioned in the bicycle rack.
Figure 3:
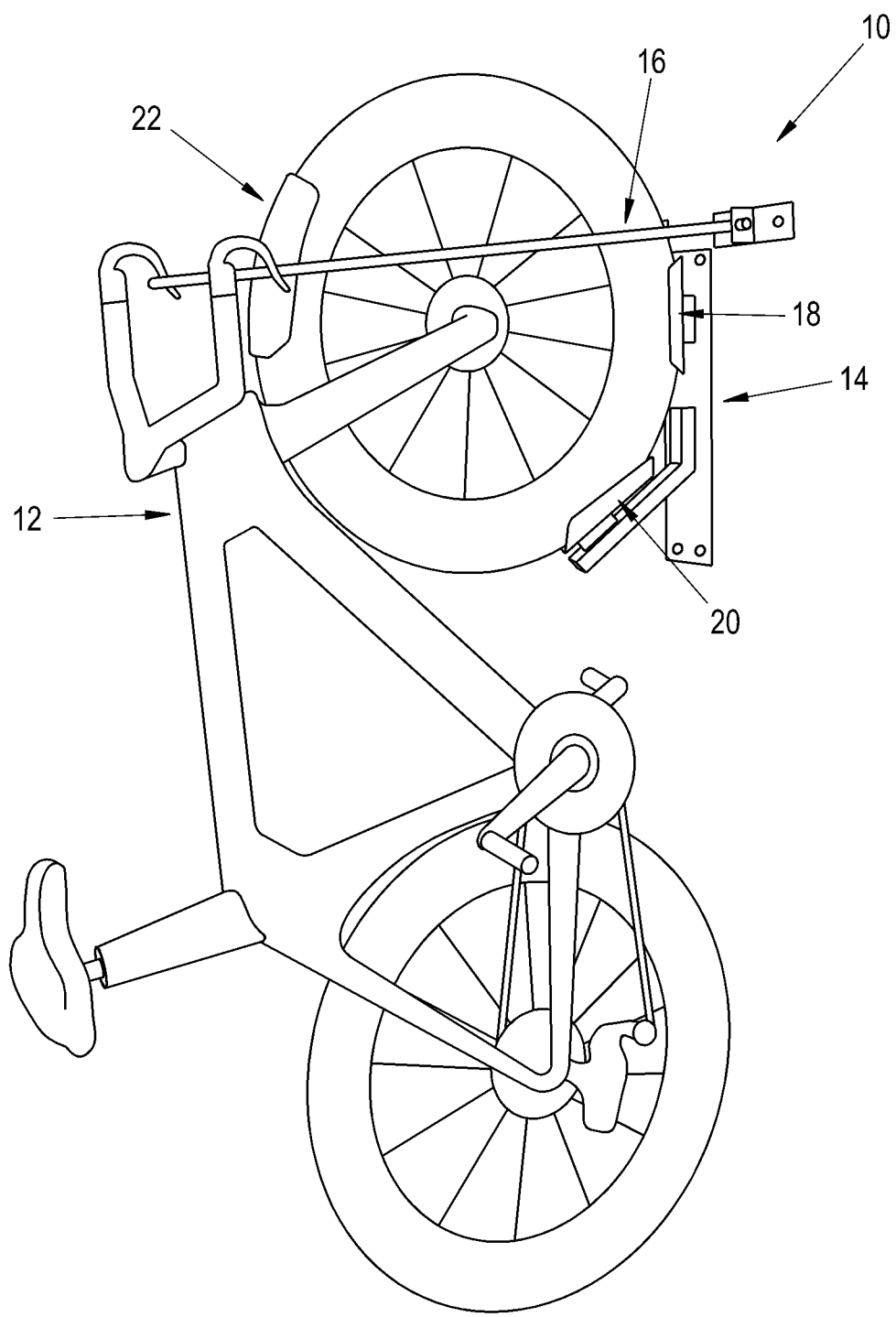
FIG. 3 is yet another side perspective view of the bicycle rack of FIGS. 1 and 2 with the front wheel secured by the bicycle rack.
Figure 4:
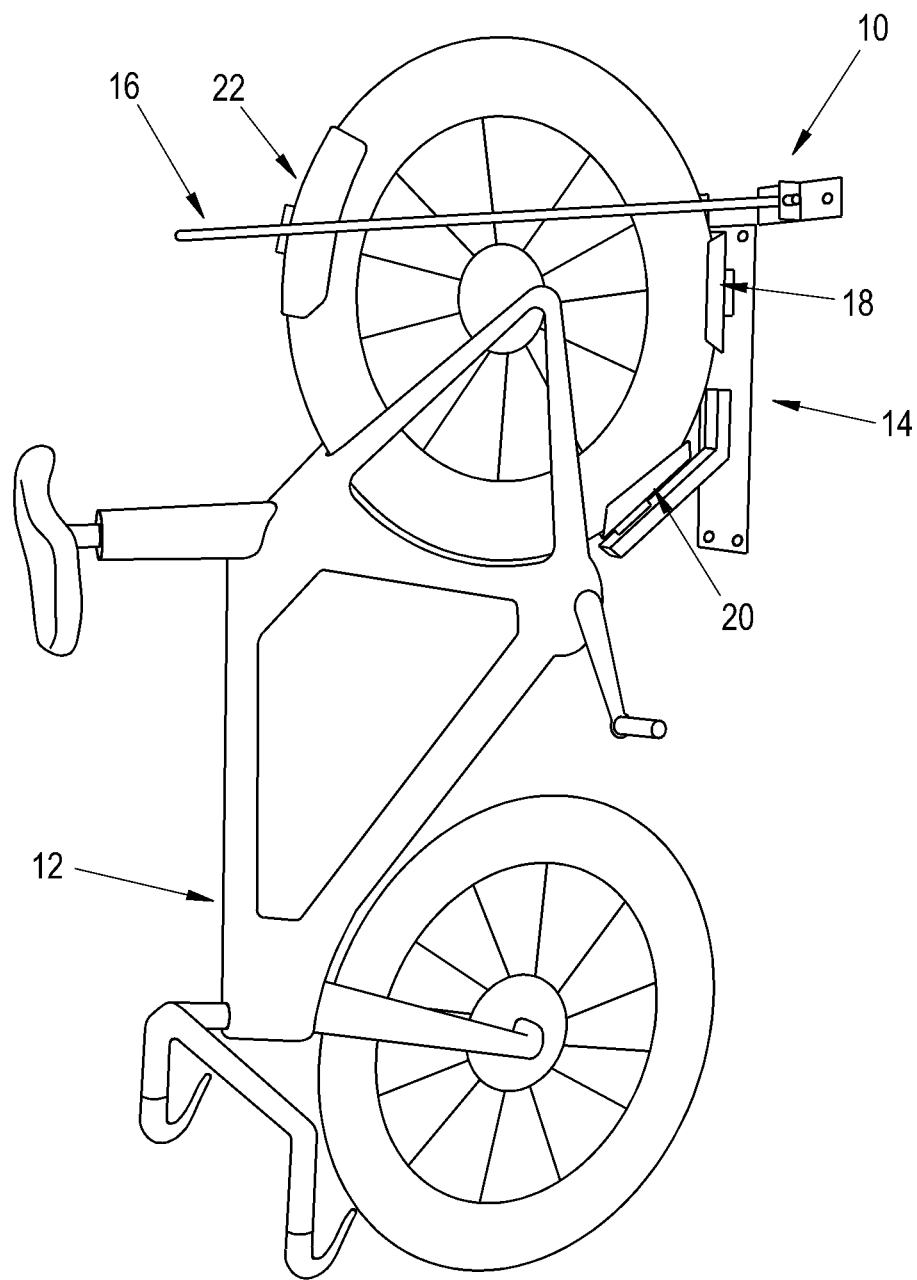
FIG. 4 is still yet another side perspective view of the bicycle rack of FIGS. 1-3 with a rear wheel of the bicycle of FIGS. 2 and 3 having been secured by the bicycle rack.

Referring now to the drawings, and more particularly to FIGS. 1-6B, there is shown a self-articulating bicycle rack 10 for mounting or otherwise holding a bicycle 12. The bicycle rack 10 may be used to mount any desired bicycle and may be considered a bicycle rack system 10. The bicycle rack 10 can be mounted on a wall so that the bicycle 12 is attached vertically, suspended by one of its wheels, either from the rear wheel, with the bike pointed downward (FIG. 4), or from the front wheel, with the bike pointed upward (FIG. 3). The bicycle rack 10 can also be oriented horizontally to serve as a rooftop or hitch mounted bike carrier. For instance, the bicycle rack 10 can be connected to a wall or other exterior or interior member of a vehicle.

The bicycle rack 10 generally includes a mounting plate 14, a swing arm 16, and at least two cradles for holding onto the exterior of the wheel of the bicycle 12. For example, the bicycle rack 10 may include at least three cradles 18, 20, 22. The bicycle rack 10 is self-articulating such that as the bicycle 12 is positioned within the bicycle rack 10, the wheel of the bicycle 12 automatically moves the swing arm 16. Thereby, the bicycle 12 may be lifted upwardly, which allows the exterior of the wheel to upwardly move the swing arm 16, so that the wheel is located within the bicycle rack 10 and the exterior of the wheel engages with each cradle 18, 20, 22. Thereafter, the bicycle 12 may be moved downwardly which allows the swing arm 16 to automatically move downwardly and lock or otherwise secure the wheel within the cradles 18, 20, 22.

The mounting plate 14 is affixable to a surface, e.g. a surface of a wall or member of a vehicle mounting bracket, with mounting plate 14 also referred to herein as a structural member 14. The mounting plate 14 may comprise a first portion for attaching the first cradle 18 and a second portion for attaching the second cradle 20. The second portion may extend outwardly and away from the first portion. Thereby, the mounting plate 14 may orient the first and second cradles 18, 20 at respective first and second angles. For example, the mounting plate 14 may orient the first cradle 18 at 90 degrees or parallel to the longitudinal axis of the mounting plate 14. Additionally, for example, the mounting plate 14 may orient the second cradle 20 at approximately 45 degrees relative to the longitudinal axis of the mounting plate 14.

Figure 6A:
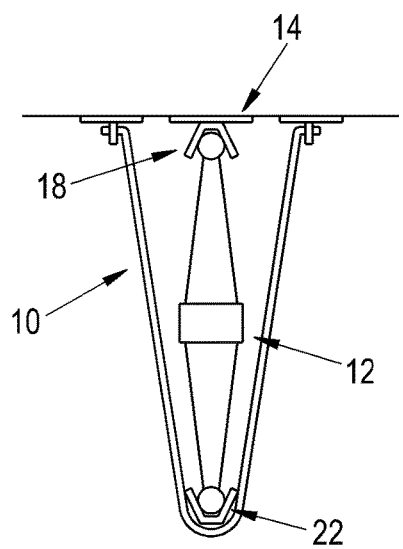
FIG. 6A is a top view of the bicycle rack of FIGS. 1-5 illustrating the capture of a wheel of the bicycle using one embodiment of a swing arm of the present invention.
Figure 6B:
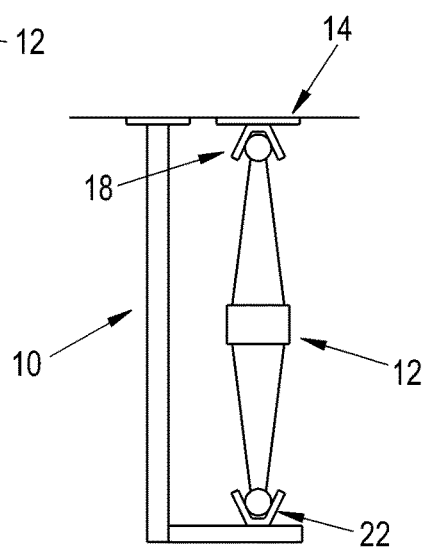
FIG. 6B is a top view of the bicycle rack of FIGS. 1-5 illustrating the capture of a wheel of the bicycle using another embodiment of a swing arm of the present invention.

The swing arm 16 can be pivotally mounted to the mounting plate 14 and/or the surface to which the mounting plate 14 is affixed. For example, the swing arm 16 may include its own respective set of swing-arm mounting plates (unnumbered) that pivotally mount the swing arm 16 to the wall. Additionally, for example, the swing arm 16 may be pivotally connected to respective receiving members of the mounting plate 14. The swing arm 16 may attach the third cradle 22. The swing arm 16 may pivot relative to the mounting plate 14, for example from 30 to 200 degrees, and may have a single member positioned to the side of the wheel of bicycle 12, as depicted in FIG. 6B. The swing arm 16 may have a first, open position for receiving the wheel and a second, closed position for locking the wheel within the bicycle rack 10, and a third position, where swing arm 16 is dropped to be generally parallel to mounting plate 14, when not in use. The swing arm 16 may comprise one or more components. For example, the swing arm 16 may comprise a pair of rods which are pivotally mounted at one end and joined to one another at their other end. From a top view, the members of the swing arm 16 form a triangle, with the two hinged points at the wall to the cradle 22 which contacts the outer edge of the wheel. Hence, the swing arm 16 may have a triangular shape, with a portion on each side of the wheel. However, the swing arm 16 may have any desired shape. Additionally, for example, the swing arm 16 may comprise a single member which articulates relative to the mounting plate 14. The swing arm 16 may comprise any desired material. It should be appreciated that the swing arm 16 may include a retaining member which retains or otherwise limits and/or biases the movement of swing arm 16.

Figure 5:
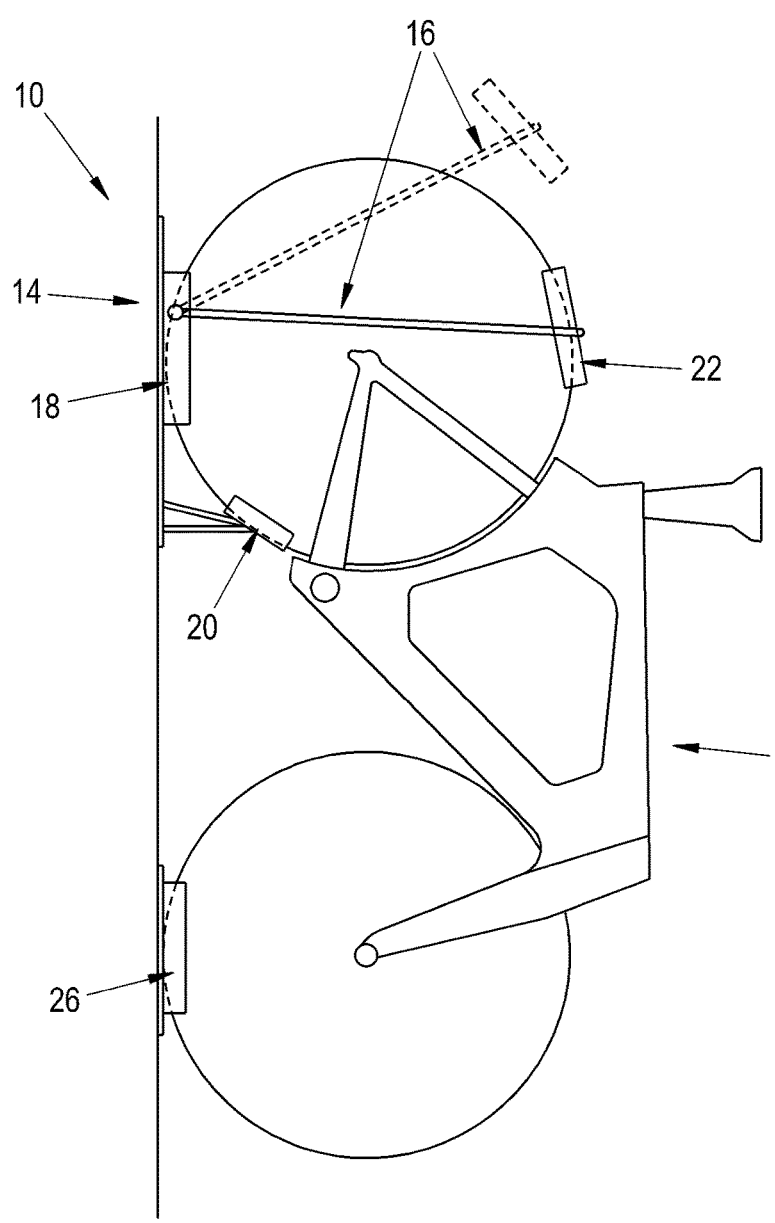
FIG. 5 is a side view of the bicycle rack of FIGS. 1-4 showing details of the bicycle rack.

Each cradle or holder 18, 20, 22 may be fixedly or movably attached to a surface, the mounting plate 14, and/or the swing arm 16. The cradles 18, 20, 22 may each have a retaining portion and a receiving portion which is wider than the retaining portion. Each cradle 18, 20, 22 may have any desired shape. For instance, each cradle 18, 20, 22 may have a straight or curved shape. The cradles 18, 20, 22 may have identical or unique shapes. One or more of the cradles 18, 20, 22 may have an approximately "U"-shape that is open at its end for receiving the wheel. The cradle 22 which is affixed to the swing arm 16 may be longer than the other cradles 18, 20. It should be appreciated that the bicycle rack 10 may also include another optional lower cradle 26 for holding the opposing bicycle wheel, which is not retained by the other cradles 18, 20, 22 (FIG. 5). Each cradle 18, 20, 22, 26 may comprise any desired material.

In more detail, the three cradles 18, 20, 22 may be located at three distinct points in order to form a triangle. The first and second cradles 18, 20 may be fixedly mounted, one at the wall and one that is approximately 45 degrees lower along the circumference of the wheel. The third cradle 22 can be mounted at the end of the swing arm 16, which rotates from a fulcrum at the wall. In the down, closed position of the swing arm 16, the third cradle 22 may contact the outer circumference of the wheel. Thus, the wheel is firmly held against the other two opposing fixed cradles 18, 20 via the third cradle 22 on the swing arm 16. As can be appreciated, the weight of the swing arm 16 may securely hold the wheel within the cradles 18, 20, 22 so that the bicycle 12 does not undesirably move within or out of the bicycle rack 10. Each wheel cradle 18, 20, 22 have a shape that accommodates the outer shape of the wheel of bicycle 12, with wheel cradle 22 being secured to a distal end of swing arm 16. Wheel cradles 18 and 20 are coupled to structural member 14, and more specifically cradle 20 is connected to a protrusion of structural member 14. It is also contemplated that for mobile applications of rack 10, a locking mechanism, not shown, would be used to secure swing arm 16 in a secured position.

Wheel cradles 18, 20, 22 are arranged and are positioned from each other along an arc A of the wheel of bicycle 12. The arc A between cradle 18 and cradle 20 is less than half of the outer circumference of the wheel and may be less than a quarter of the outer circumference of the wheel. This arrangement, along with friction of the tire with the cradles 18, 20, 22, is what secures bicycle 12 to rack 10, such that the weight of bicycle 12 exerts a downward force that causes swing arm 16 to pull further downward toward bicycle 12 preventing the distance of arc A from opening outward, until someone lifts bicycle 12 thereby disrupting the securing features of rack 10. The arc is located toward a frame of bicycle 12. While the positioning of rack 10 is shown in FIGS. 1-6 is such that swing arm 16 is biased toward bicycle 12 by gravity, a spring bias can also be used when rack 10 is used in different orientations.

Swing arm 16 is configured to swing upward as bicycle 12 is inserted into rack system 10 as the wheel contacts wheel cradle 22 causing swing arm 16 to swing upward. As the wheel settles into wheel cradle 20, wheel cradle 22 swings downward with swing arm 16 along the outer surface of the wheel so that the wheel additionally settles into wheel cradle 18. Swing arm 16 will swing upward as bicycle 12 is lifted thereby disengaging the wheel from wheel cradles 18, 20 and 22, and then swing arm 16 will swing down as the wheel is removed outward from rack system 10. Swing arm 16 is symmetrically shaped with wheel cradle 18 affixed to an inner portion of the distal end of swing arm 16. Swing arm 16 can be a single arm as illustrated in FIG. 6B.

According to another aspect of the present invention, multiple bicycle racks 10 may be jointly assembled on a cart assembly. The cart assembly can facilitate handling, movement or storage of several bikes as a single unit, at one time. The cart assembly would be made up of a wheeled horizontal frame with caster wheels at each corner and vertical frame to which several racks 10 would be mounted. The racks 10 may be mounted adjacent to one another in a side-by-side fashion. Additionally or alternatively, the racks 10 may be mounted staggered to one another. The bikes could then be attached to each rack 10 so that they could then be wheeled as a single unit to be stored in a building or onto or off a truck for efficient loading or onloading of the truck. Once on a truck, the cart assembly would be secured to one of the interior walls of the truck, or a wall mounted rail, for transport to the desired destination or sorting facility, wherein the bikes may be transferred to a different truck for subsequent transport to a final destination.

Now, additionally referring to FIGS. 7-12, there is shown another embodiment of the present invention in which bicycle rack 10 is part of a bicycle rack work stand 110 for mounting or otherwise holding bicycle 12, so that maintenance can be performed on bicycle 12. Bicycle rack work stand 110 may be used to mount/hold any desired bicycle and may also be considered a bicycle rack system 110. Bicycle work stand 110 is supported on the floor so that the bicycle 12 is elevated and is attached vertically, supported by its front wheel and a support bracket 114. A framework 116 is coupled with bracket 114 and with rack 10 having front wheel cradle 18.

Support bracket 114 has bolt holes along a horizontal floor so that fasteners may be used to connect support bracket 114 to framework 116. Support bracket 114 has two side rails 118 and 120 and a stabilizing tab 122. Side rails 118 and 120 have a curved inclined shape upon which a frame of bicycle 12 can rest. The inclined shape of rails 118 and 120 cause the frame of bicycle 12 to move toward stabilizing tab 122 so that the frame portion of bicycle 12, which is in the area of the crank of bicycle 12 comes to rest on rails 118 and 120, and against stabilizing tab 122. The accommodating shape of the top portion of support bracket 114 serves to hold and stabilize bicycle 12 in a manner that allows access to the elements of bicycle 12, so that maintenance can be performed without a need to shift elements of the supporting system to access bicycle 12.

Support bracket 114 may be formed from a single piece of flat metal that is shaped and then bent and welded to form the three-dimensional shape illustrated herein. It is contemplated that support bracket 114 can also be made from a plastic material. A certain amount of asymmetrical shape is used to accommodate the frame of bicycle 12 and the shape is such that it accommodates bicycles of various brands and configurations. Further, the position of bracket 114 is adjustable along frame 116 to be adaptable to various bike sizes/wheel bases.

Figure 7:
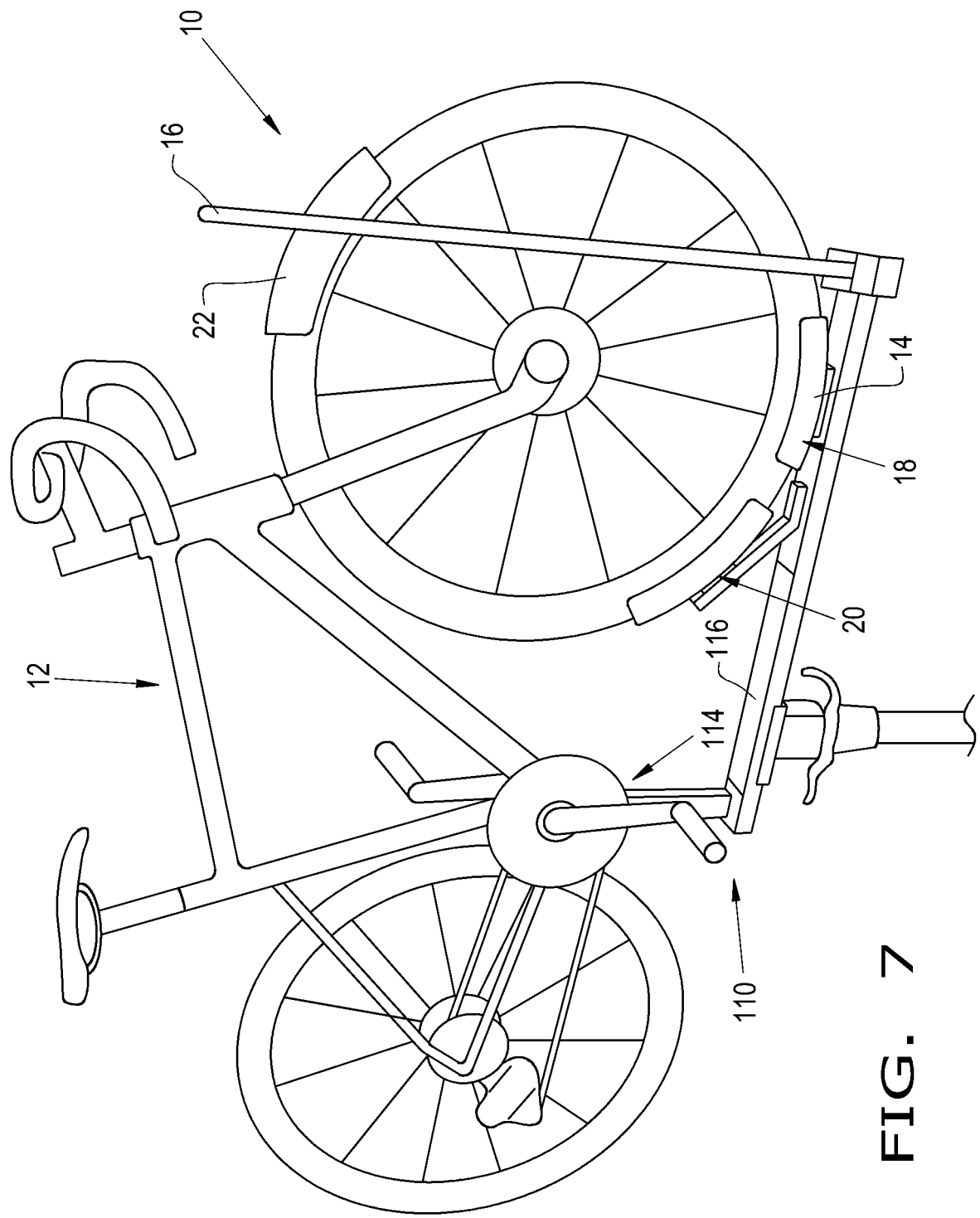
FIG. 7 is a side view of another embodiment of a bicycle rack system of the present invention in the form of a bicycle rack work stand, with a bicycle positioned therein.
Figure 8:
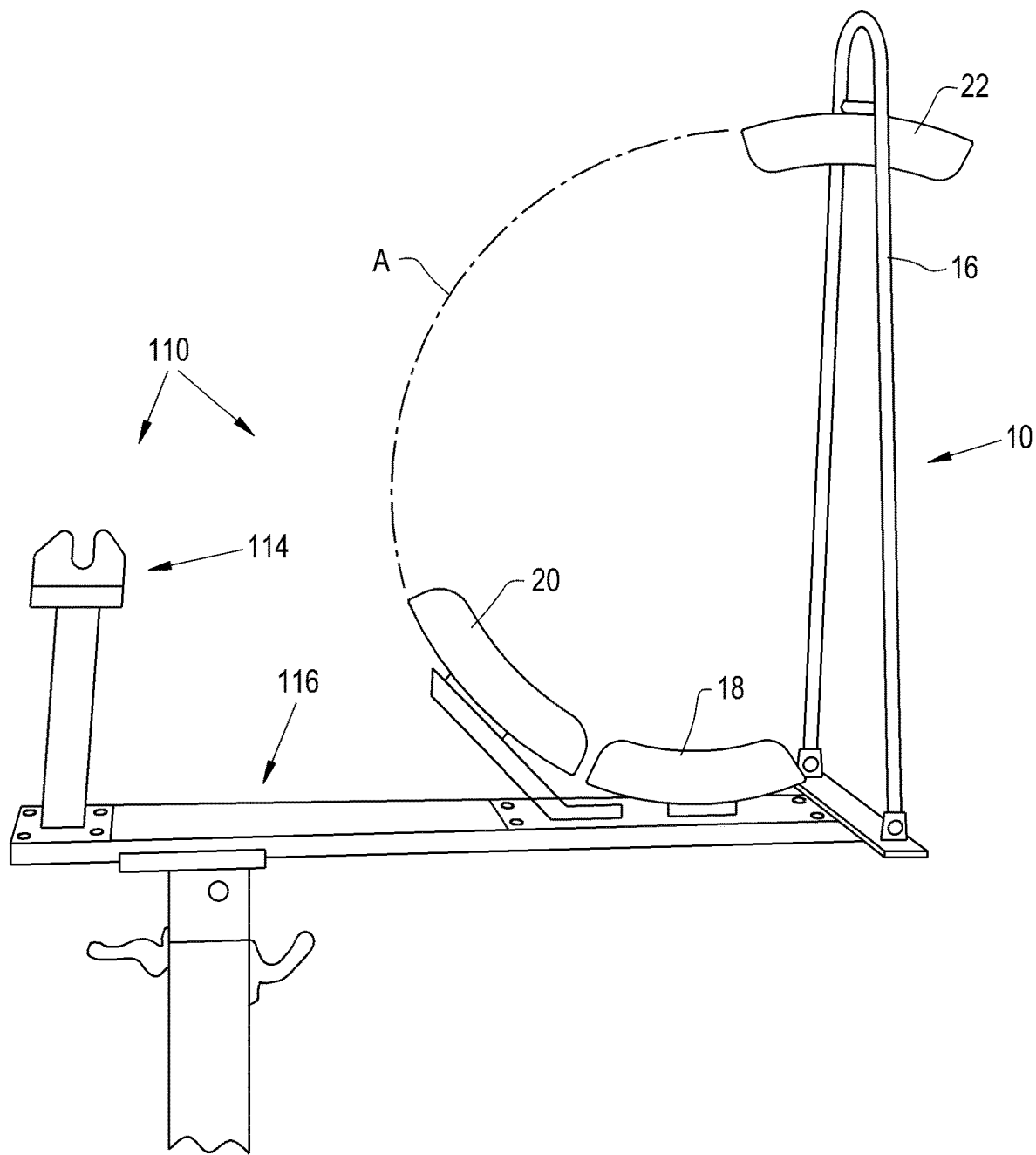
FIG. 8 is a side view of the bicycle rack work stand of FIG. 7 without the bicycle therein.
Figure 9:
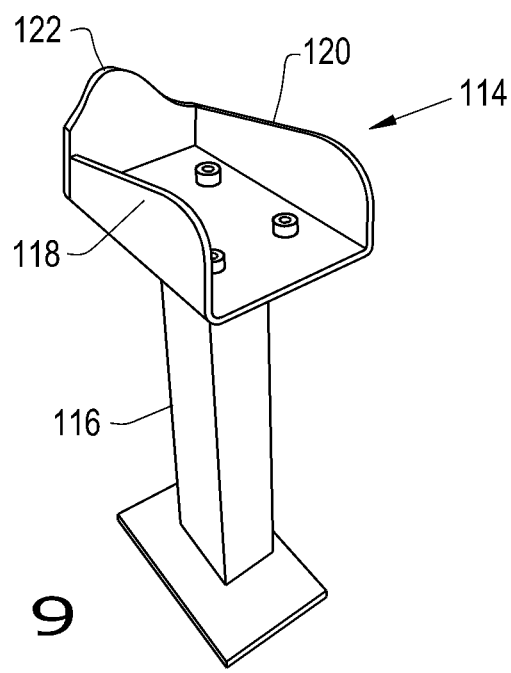
FIG. 9 is a perspective view of a support bracket used with the bicycle rack work stand of FIGS. 7 and 8.

In FIG. 7, it can be seen that bicycle 12 is positioned in work stand 110 allowing access to all portions of bicycle 12. In FIG. 8 there is shown a first embodiment of bracket 114 coupled to frame 116. FIG. 9 illustrates bracket 114 fastened to a portion of frame 116. The curved and inclined top surfaces of rails 118 and 120 are easily seen as they would settle bicycle 12 against stabilizing tab 122.

Figure 10:
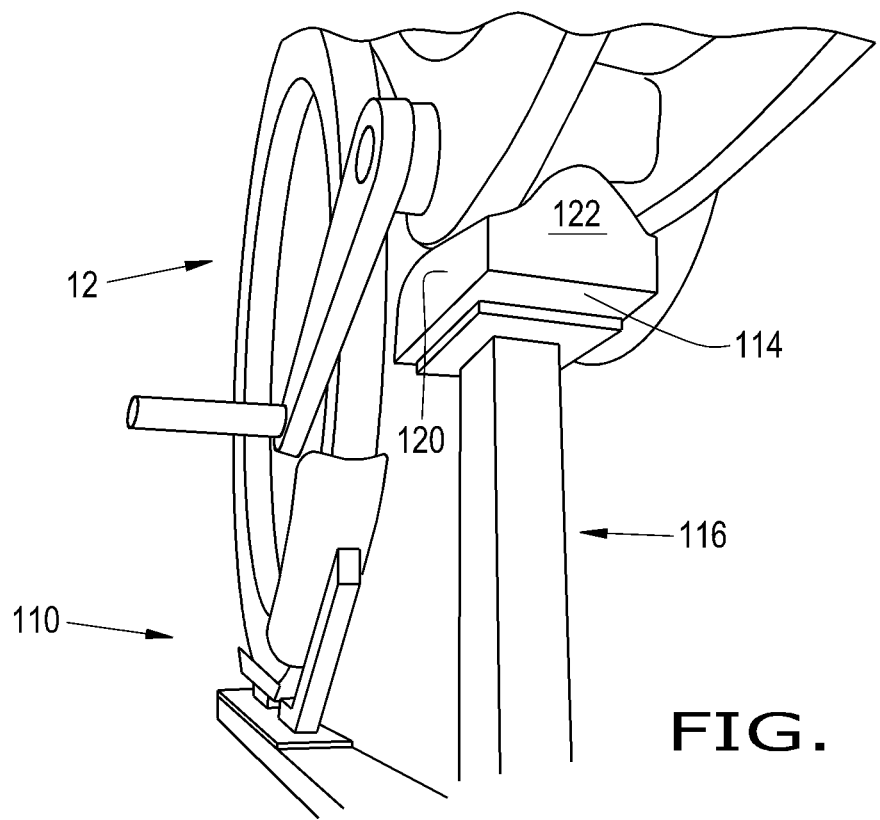
FIG. 10 is another perspective view of the support bracket of FIG. 9, with the bicycle being supported thereby.
Figure 11:
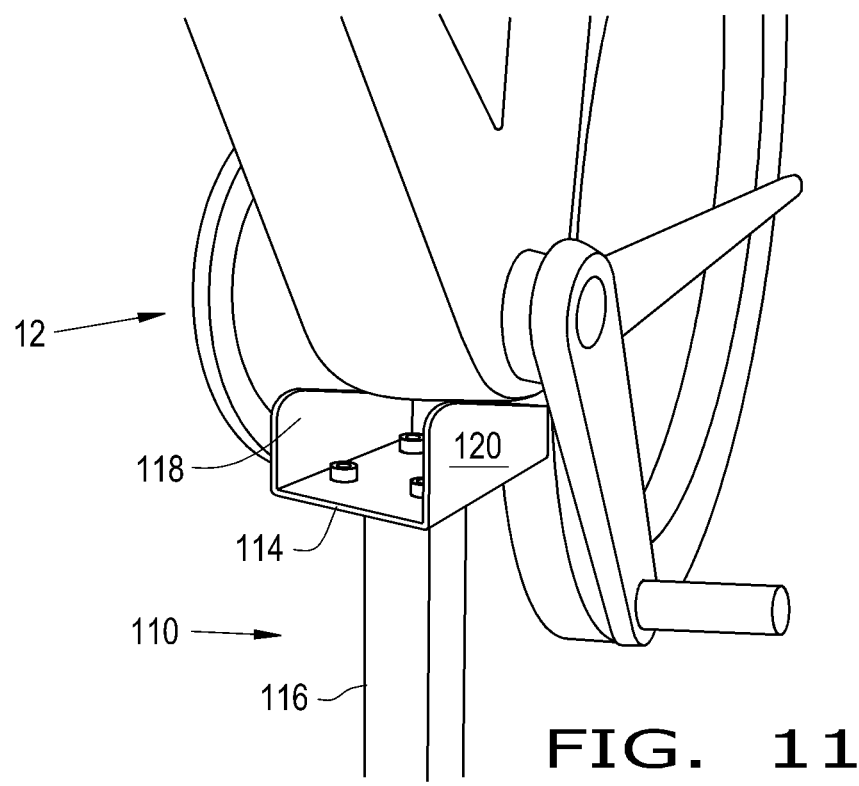
FIG. 11 is yet another perspective view of the support bracket of FIGS. 9 and 10.
Figure 12:
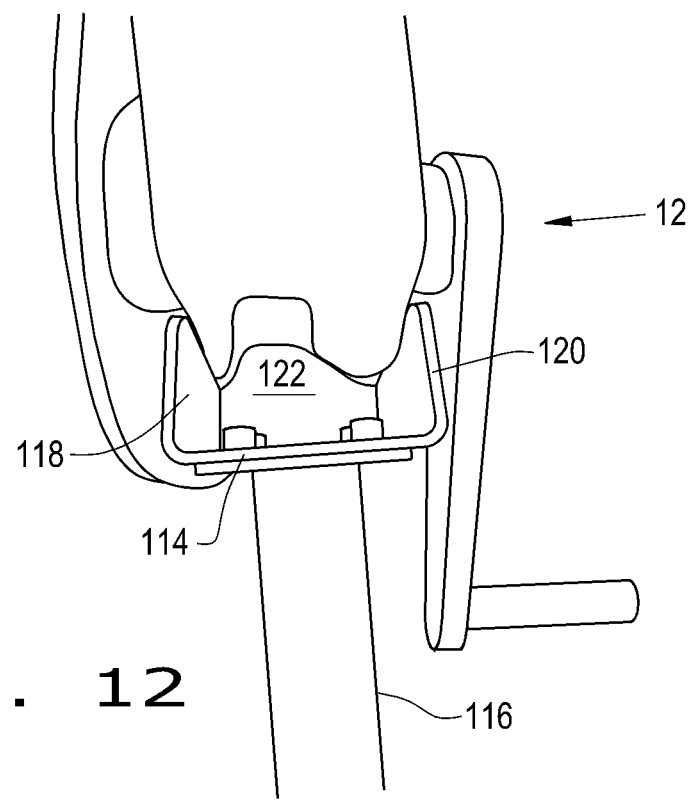
FIG. 12 is a view from the front of the bicycle looking into the support bracket of FIGS. 9-11, illustrating the asymmetrical form of the bracket that interacts with the rails of the bicycle frame.

In FIG. 10 bracket 114 is engaged with bicycle 12 as you look forward to the front wheel of bicycle 12. Bracket 114 is shaped to accommodate the crank housing of bicycle 12. Another view of bracket 114 is shown in FIG. 11, looking aft with the rear wheel of bicycle 12 shown and it can be seen how the inclined surfaces of rails 118 and 120 encourage the crank housing to slide toward stabilizing tab 122 (hidden in FIG. 5 by the crank housing). FIG. 12 is a view of bracket 114 looking directly aft and generally in line with a longitudinal axis of bicycle 12.

Support bracket 114 is positioned to support the frame of bicycle 12 proximate to a crank of bicycle 12. Support bracket 114 is asymmetrically shaped to accommodate an asymmetry of the frame of bicycle 12. Support bracket 114 has an extending portion 122 in the form of stabilizing tab 122 against which a portion of the bicycle frame that contains a portion of the crank of bicycle 12 rests.

In either embodiment of the present invention of bicycle rack system 10, 110 a method of holding or supporting bicycle 12 is accomplished by moving a wheel of bicycle 12 against wheel cradle 22 of swing arm 16. The moving of the wheel causes swing arm 16 to traverse in a pivotal direction relative to structural member 14. System 10, 110 engages a portion of the wheel in wheel cradle 20 while wheel cradle 22 and swing arm 16 traverse opposite to the pivotal direction in which swing arm 16 was initially moved, to thereby engage the wheel in wheel cradles 18, 20, 22.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bicycle rack system to hold a bicycle, comprising:
   a structural member;
   a swing arm pivotally coupled to the structural member; and
   a plurality of wheel cradles, each wheel cradle having a shape to accommodate a shape of a wheel of the bicycle, the plurality of wheel cradles including a first wheel cradle and a second wheel cradle, the first wheel cradle being secured to a distal end of the swing arm, the second wheel cradle being coupled to the structural member, the first wheel cradle and the second wheel cradle engaging the wheel of the bicycle in an over-center manner.

2. The bicycle rack system of claim 1, wherein the first wheel cradle and the second wheel cradle are arranged to be positioned from each other along an arc of the wheel of the bicycle, the arc being less than half of the outer circumference of the wheel.

3. The bicycle rack system of claim 2, wherein the arc is located toward a frame of the bicycle.

4. The bicycle rack system of claim 1, wherein the swing arm is configured to swing upward as the bicycle is being inserted into the rack system as the wheel contacts the first wheel cradle.

5. The bicycle rack system of claim 4, wherein as the wheel settles into the second wheel cradle, the first wheel cradle swings downward along the outer surface of the wheel so that the wheel additionally settles into the first wheel cradle.

6. The bicycle rack system of claim 5, wherein the swing arm is further configured to swing upward as the bicycle is lifted thereby disengaging the wheel from the second wheel cradle, and then the swing arm will swing down as the wheel is removed outward from the rack system.

7. The bicycle rack system of claim 1, wherein the swing arm has a limited downward movement.

8. The bicycle rack system of claim 1, wherein the swing arm extends from the structural member along one or both sides of the wheel.

9. The bicycle rack system of claim 7, wherein the swing arm is symmetrically shaped with the first wheel cradle affixed to an inner portion of the distal end of the swing arm.

10. The bicycle rack system of claim 1, wherein the plurality of wheel cradles additionally includes a third wheel cradle, the third wheel cradle being connected to the structural member, the second wheel cradle being connected to a portion of the structural member.

11. The bicycle rack system of claim 10, wherein the structural member is affixed to a wall.

12. The bicycle rack system of claim 10, further comprising:
a framework configured to sit on a generally horizontal surface, the framework supporting the structural member; and
a support bracket coupled to the framework, the support bracket being shaped to support a frame of the bicycle.

13. The bicycle rack system of claim 12, wherein the support bracket is positioned to support the frame of the bicycle proximate to a crank of the bicycle.

14. The bicycle rack system of claim 12, wherein the support bracket is asymmetrically shaped to accommodate an asymmetry of the frame of the bicycle.

15. The bicycle rack system of claim 12, wherein the support bracket has an extending portion against which a portion of the bicycle frame that contains a portion of a crank of the bicycle rests.

16. A method of holding a bicycle in a bicycle rack system, comprising the steps of:
moving a wheel of the bicycle against a first wheel cradle of a swing arm, the moving of the wheel causing the swing arm to traverse in a pivotal direction relative to a structural member; and
engaging a portion of the wheel in a second wheel cradle while the first wheel cradle and the swing arm traverse opposite to the pivotal direction to thereby engage the wheel in the first and second wheel cradles in an over-center manner.

17. The method of holding a bicycle in a bicycle rack system of claim 16, wherein the first wheel cradle and the second wheel cradle are arranged to be positioned from each other along an arc of the wheel of the bicycle, the arc being less than half of the outer circumference of the wheel.

18. The method of holding a bicycle in a bicycle rack system of claim 17, wherein the arc is located toward a frame of the bicycle.

19. The method of holding a bicycle in a bicycle rack system of claim 16, further comprising the steps of:
supporting the structural member with a framework configured to sit on a generally horizontal surface; and
supporting a frame of a bicycle on a support bracket coupled to the framework.

20. The method of holding a bicycle in a bicycle rack system of claim 19, wherein the support bracket is asymmetrically shaped to accommodate an asymmetry of the frame of the bicycle.

* * * * *